(12) United States Patent
Lipman et al.

(10) Patent No.: US 9,157,991 B2
(45) Date of Patent: *Oct. 13, 2015

(54) MECHANISM FOR PROXIMITY DETECTION BASED ON WI-FI SIGNALS

(71) Applicant: INTEL CORPORATION, Santa Clara, CA (US)

(72) Inventors: Justin Lipman, Shanghai (CN); Trevor Pering, San Francisco, CA (US); Chengxue Zhao, Shanghai (CN); Kenton Michael Lyons, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,050

(22) Filed: Jul. 16, 2014

(65) Prior Publication Data

US 2015/0038163 A1 Feb. 5, 2015

Related U.S. Application Data

(63) Continuation of application No. 12/999,629, filed as application No. PCT/CN2010/001599 on Oct. 13, 2010, now Pat. No. 8,824,316.

(51) Int. Cl.
*H04L 12/26* (2006.01)
*G01S 11/06* (2006.01)
*H04W 4/00* (2009.01)
(Continued)

(52) U.S. Cl.
CPC .............. *G01S 11/06* (2013.01); *G01S 5/0215* (2013.01); *G01S 11/14* (2013.01); *H04W 4/00* (2013.01); *H04W 24/00* (2013.01)

(58) Field of Classification Search
CPC ................................ H04W 24/00; H04W 4/00
USPC .................................................. 370/252, 332
See application file for complete search history.

(56) References Cited

U.S. PATENT DOCUMENTS 7,129,891 B2    10/2006   Meunier
2007/0052534 A1    3/2007   Bird et al.
(Continued)

FOREIGN PATENT DOCUMENTS

CN      1619334      5/2005
CN      1867836      11/2006
(Continued)

OTHER PUBLICATIONS

Office Action in Russian Application No. 2013121572 (PCT/CN2010/001599) Translation, issued Apr. 29, 2014, 6 pages.
(Continued)

*Primary Examiner* — Sai-Ming Chan
(74) *Attorney, Agent, or Firm* — Blakely, Sokoloff, Taylor & Zafman LLP (57) ABSTRACT

A mechanism is described for proximity detection based on Wi-Fi signals. A method of embodiments of the invention includes determining strength of one or more signals being communicated between one or more antennae of a first device and two or more antennae of a second device. The one or more signals are associated with a broadcast packet. The method further includes determining proximity of the first device and the second device based on the determined strength of the one or more signals.

20 Claims, 7 Drawing Sheets

(51) Int. Cl.
*G01S 5/02* (2010.01)
*G01S 11/14* (2006.01)
*H04W 24/00* (2009.01)

(56) References Cited

U.S. PATENT DOCUMENTS

2008/0130604 A1* 6/2008 Boyd ........................ 370/338
2010/0159840 A1  6/2010 Rosener

FOREIGN PATENT DOCUMENTS

| | | |
|---|---|---|
| CN | 101320090 | 12/2008 |
| CN | 201294639 | 8/2009 |
| CN | 201523451 | 7/2010 |
| JP | 200743246 | 2/2007 |
| JP | 201035179 | 2/2010 |
| WO | WO-2005122483 | 12/2005 |

OTHER PUBLICATIONS

JP 2013-533063, "*Organized Translation of Notice of Reasons for Rejection*", mailed Mar. 1, 2014, 3 pages.

"Notification of Transmittal of the International Search Report and the Written Opinion of the International Searching Authority", International Application No. PCT/CN2010/001599, 11 pages, mailed Jul. 7, 2011.

Office Action counterpart Chinese Patent Application No. 201080026105.4, mailed Apr. 2, 2014, 17 pages.

Office Action counterpart Chinese Patent Application No. 201080026105.4, mailed Oct. 20, 2014, 17 pages.

Office Action counterpart Chinese Patent Application No. 201080026105.4, mailed Jul. 11, 2013, 19 pages.

Reasons for Rejection counterpart Japanese Patent Application No. 2013-533063, mailed Mar. 1, 2014, 3 pages.

Reasons for Rejection counterpart Japanese Patent Application No. 2013-533063, mailed Dec. 2, 2014, 1 page.

Office Action counterpart Russia Patent Application No. 2013121572, mailed Apr. 29, 2014, 6 pages.

Notice of Allowance counterpart Korean Patent Application No. 2013-7012234, mailed Nov. 19, 2014, 1 page.

Office Action counterpart Korean Patent Application No. 2013-7012234, mailed Apr. 29, 2014, 4 pages.

* cited by examiner

MECHANISM FOR PROXIMITY DETECTION BASED ON WI-FI SIGNALS

RELATED APPLICATIONS AND CLAIM OF PRIORITY

This application is a continuation U.S. patent application Ser. No. 12/999,629, entitled "Mechanism for Proximity Detection Based on Wi-Fi Signals", by Justin Lipman, et al., filed Mar. 2, 2012, now allowed, which is a U.S. National Phase Application under 35 U.S.C. §371 of International Application No. PCT/CN10/01599, entitled "Mechanism for Proximity Detection Based on Wi-Fi Signals", by Justin Lipman, et al., filed Oct. 13, 2010, the benefit of and priority to all are claimed thereof and the entire contents of which are incorporated herein by reference.

FIELD

The field relates generally to computing devices and, more particularly, to employing a mechanism for proximity detection based on Wi-Fi signals.

BACKGROUND

Current trends in mobile computing are enabling new usage models based on local distributed system either among similar devices, such as laptops, smart phones, etc., or between a mobile device and an element in the infrastructure. However, in this growing trend, the conventional solutions for calculating device proximity between computing devices (e.g., the distance or proximity between various computing devices) are limited in their scope and/or inefficient. One solution involves Near Field Communication (NFC) that requires extremely close range (e.g., 10 cm) between devices to work. Further, this NFC solution may work for systems that integrate a small smart-phone device with a fixed point-of-sale NFC reader; however, with two or more mobile devices, such as netbooks, personal computers (PCs) in a group setting (e.g., classroom), this NFC solution does not work because it requires an exact placement of NFC contact points between the devices.

Another conventional solution is the single-antennae RSSI measurement technique. However, this technique is not suitable due to high variance signal strength measurements caused by multi-path signal propagation and other sources of interference. Yet another conventional solution is time synchronization, which is typically accomplished using over-the-network Network Time Protocol (NTP). This solution is suitable for synchronizing the system clock to user-perceptible levels over a wide area, but does not provide the tight fine-grain synchronization necessary for doing audio co-localization.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for proximity detection based on Wi-Fi signals. A method of embodiments of the invention includes determining strength of one or more signals being communicated between one or more antennae of a first device and two or more antennae of a second device. The one or more signals are associated with a broadcast packet. The method further includes determining proximity of the first device and the second device based on the determined strength of the one or more signals.

In one embodiment, Wi-Fi signals are used to measure proximity between two or more computing devices (e.g., notebooks or laptops, personal computers, mobile computing devices, handheld devices, smart phones, etc.). A computing device is synonymously referred to as a computer, a data processing device, a machine, or merely a device, etc., throughout this document. In one embodiment, Wi-Fi antennae employed on each computer are used to provide signal strength differentiation between, for example, left and right antenna of a computer to provide a measurement of proximity. This technique uses strategic placement of two or more antennae on each device to provide a multiple measurements of proximity, which improves detection of proximity and determination of direction and aspect (e.g., left, right, front, back) of the computing devices relative to each other. In another embodiment, Wi-Fi access point beacons are used to perform tight time synchronization between various computing devices, which can be used for audio-based co-localization. In yet another embodiment, adaptive clocking is used to measure local interferences (associated with nearby devices) and these interferences are then used as signals for measuring proximity.

Figure 1:
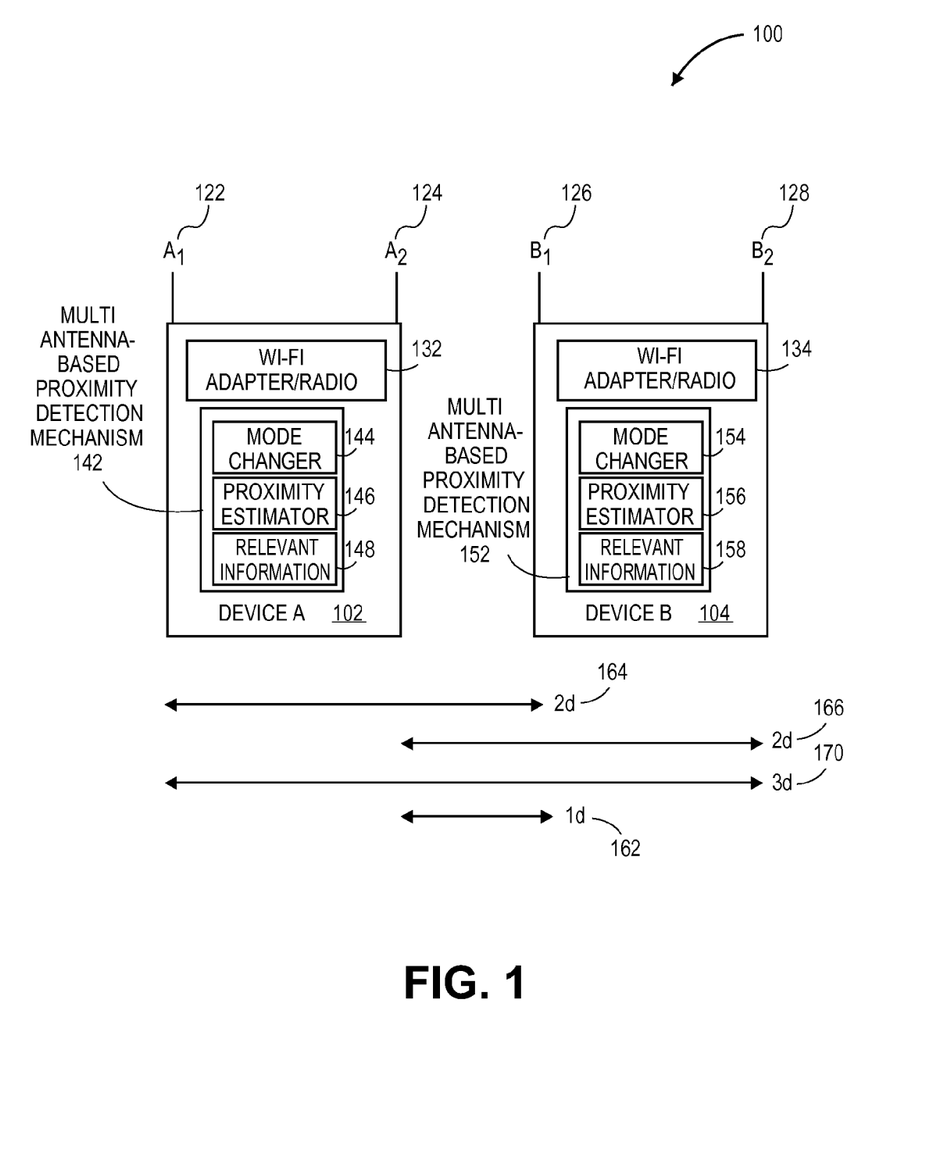
FIG. 1 illustrates a multi-antennae proximity detection system for detecting proximity between computing devices using Wi-Fi signal strength of signals emitted from multiple antennae according to one embodiment of the invention.

FIG. 1 illustrates a multi-antennae proximity detection system 100 for detecting proximity between computing devices using Wi-Fi signal strength of signals emitted from multiple antennae according to one embodiment of the invention. In the illustrated embodiment, two computing devices A 102 and B 104 (e.g., PCs, laptops, handhelds, etc.) are shown in a given proximity and as having multiple Wi-Fi antennae A1-A2 122-124 and B1-B2 126-128 (e.g., IEEE 802.11b-based antennae), respectively, placed on them. For example, in a classroom setting, computing devices A 102 and B 104 could be two computers being used by a couple of students out of several students and even a professor with each having a computing device of his or her own. Stated differently, it is contemplated that several computing devices may be involved that proximity detection between any two or more devices, using embodiments of the invention, may be performed on a very large scale; however, for brevity, simplicity, and ease of understanding, simpler examples (such that one illustrated with respect to FIG. 1) are provided throughout this document but that the embodiments of the invention are not limited to these examples.

In one embodiment, the measure of signal strength associated with each signal that is put out by each antenna 122-128 is determined and then the relative difference in the signal strength is used to calculate the proximity of or the distance between the devices 102, 104. For example, based on knowing that the farther the wireless signal travels, the more it drops, an estimate of distance between various computing devices can be calculated. In other words, if a signal is sent from B1 126 to A1 122 and A2 124, the signal between B1 126 and A2 124 is expected to be louder than the signal between B1 126 and A1 122 and using this loudness and dropping off of signals can be used to determine device proximity estimate between computing devices A 102 and B 104. In the illustrated embodiment, there are four pair-wise distances between four antennae 122-128: A1 122–B1 126=2d; A2 124–B2 128=2d; A2 124–B1 126=1d; and A1 122–B2 128=3d. Given the distance squared ($d^2$) signal strength drop-off between the computing systems 102, 104, A2 124 and B1 126 can be expected to have a 9× higher Received Signal Strength Indication (RSSI) over A1 122 and B 2 128, indicating left-right proximity for devices A 102 and B 104 to have a higher differential. As illustrated, the distance, as measured using signal strengths, the A1-B1 distance 164 which is 2d is the same as the A2-B2 distance 166, while distance 1d is measure to be the shortest distance which is between antennae A2 124 and B1 126, while distance 3$d$ is the longest distance which is between antennae A1 122 and B2 128.

As illustrated, each device 102, 104 includes a Wi-Fi adapter/radio 132, 134 which is used to detect and measure the RSSI signal being transmitted through the antennae 122-128 between the two computing devices A 102 and B 104. Additionally, in one embodiment, each device 102, 104 employs a multi-antennae proximity detection mechanism 142, 152 (multi-antennae mechanism) to estimate proximity of devices 102, 104. In one embodiment, the multi-antenna mechanism 142, 152 may include several components 144-148, 154-158 but is not necessarily limited to those components. For example, a mode changer 144, 154 that may be used for changing the signal mode on each device 102, 104 when measuring the proximity such that the data being carried by these signals becomes irrelevant and the focus shifts to the strength of such signals. This mode changing may be performed on both the transmitting and receiving device. The multi-antennae mechanism 142, 152 further includes access to relevant information 148, 158 (such as physical layout) relating to the two devices 102, 104 that can be used to calculate proximity. For example, in the illustrated embodiment, based on the physical layout of the two devices 102, 104, the proximity is determined to be left-right proximity to have a higher differential. Similarly, the proximity could be top-bottom, bottom-top, right-left, and the like.

Another component that the multi-antennae mechanism 142, 152 includes is proximity estimator 146, 156. Proximity estimator 146, 156, in one embodiment, estimates or calculates the proximity between devices 102, 104 as aforementioned. In other words, the proximity estimator 146, 156 provides the final calculation or estimation of proximity based on signal strength, as aforementioned, in taking into account the necessary information obtained through its relevant information 148, 158, Wi-Fi adapter/radio 132, 134, and the like.

In one embodiment, multi-antennae mechanism 142, 152 uses the built-in Wi-Fi adapter/radio 132, 134 and one or more available strategically-placed antennae 122-128 to determine the location aspect (e.g., left, right, front, and back) of the devices 102, 104 to each other within a given distance (e.g., one meter or less). The RSSI at each antenna 122-128 for each broadcast or discovery packet received is used to provide a differential indicator between the two antennae (between which the signal is being broadcast), such as antenna A1 122 and antenna B2 128. If the measured RSSI at the left side antenna (e.g., A1 122) is significantly greater than the measurement at the right side antenna (e.g., B2 128) of the system 100, then the target device is within proximity to the left, or, if the measured RSSI on the right side antenna (e.g., B2 128) is significantly stronger than the measurement at the left side antenna (e.g., A1 122), then the target device is within proximity to the right. There is a measurable difference between antennae, e.g., A1 122 and B2 128, due to wireless free space path loss (attenuation) of $d^2$. Further, for example, the placement of antenna elements on opposite sides of a device 102, 104 may create an additional barrier resulting in additional path loss and signal differentiation.

It is to be noted that currently, the beacon data-rates are transmitted at IEEE 802.11b data rates (which is common practice for control and broadcast frames), providing two or more RSSI measurements for each broadcast packet. The multi-antenna 802.11n coding scheme, at this time, does not provide the ability for antenna signal-strength differentiation; although, the higher 802.11n data-rates may be used for active data communication. It is contemplated that embodiments of the invention are not limited to any particular technology or standard and is dynamic enough to adopt the changing technology and standards.

Figure 2:
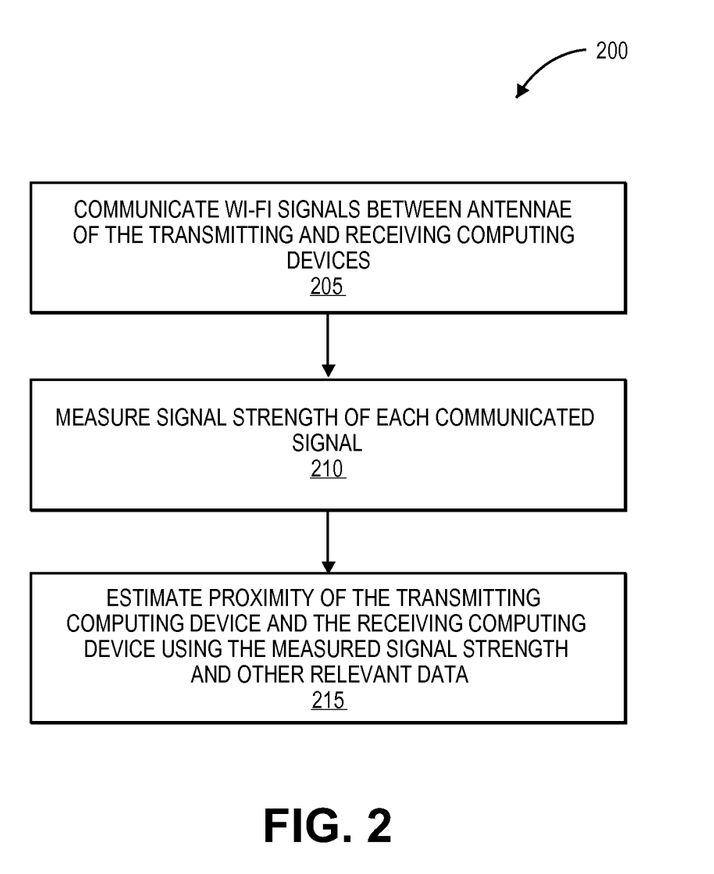
FIG. 2 illustrates a method for multi-antennae-based proximity detection according to one embodiment of the invention.

FIG. 2 illustrates a method for multi-antennae-based proximity detection according to one embodiment of the invention. Method 200 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 200 is performed by multi-antennae proximity detection mechanism of FIG. 1.

Method 200 starts at block 205 with initiating communication (sending and receiving) of Wi-Fi signals (e.g., RSSI signals) between one or more antennae of a transmitting computing device and one or more antennae of a receiving computing device. At block 210, the signal strength of each of the communicated signal is measured. At block 215, using the measured signal strength of signal and other relevant information (e.g., physical layout of the devices), proximity of the two devices is measured.

Figure 3:
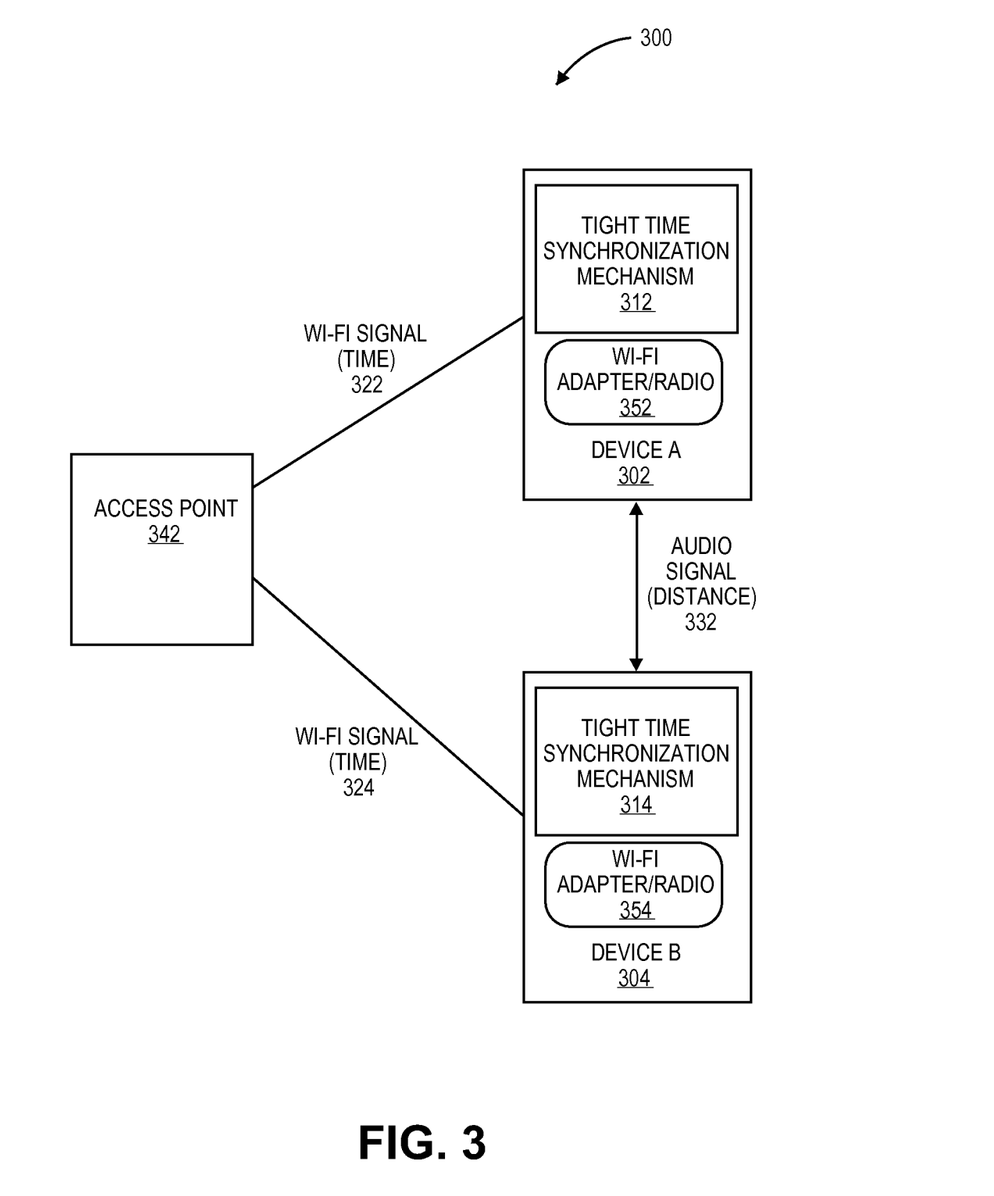
FIG. 3 illustrates a tight time synchronization mechanism for detecting proximity between computing devices using Wi-Fi signals according to one embodiment of the invention.

FIG. 3 illustrates a tight time synchronization mechanism 200 for detecting proximity between computing devices using Wi-Fi signals according to one embodiment of the invention. In the illustrated embodiment, two computing devices A 302 and B 304 are shown in communication with each other and connected with an access point 342. In one embodiment, Wi-Fi signals 322, 324 are sent from the access point 342 to the two devices 302, 304 and embedded in each of those Wi-Fi signals 322, 324 is either time or something else (e.g., clock, counter, etc.) that can be used by tight time synchronization mechanism 312, 314 (time mechanism) to determine the exact time at the two devices 302, 304. In other words, access point 342 issues the time or a clock or the like that can be used by time mechanism 312, 314 to measure time across all devices 302, 304. At this known time, an audio signal 332 is communicated between the two devices 302, 304, such as an audio burst is sent from device A 302 to device B 304 at the known time that was determined from the Wi-Fi signal 322, 324 sent from the access point 342. As aforementioned, the time was either embedded in the Wi-Fi signal 322, 324 and detected by the time mechanism 312, 314 or a clock or counter was provided by the Wi-Fi signal 322, 324 and the time was calculated or determined from it by the time mechanism 312, 314.

In one embodiment, the send time of the audio signal 332 being sent from device A 302 to device B 304 is known and then, the receive time of the audio signal 332 is known when the signal 332 is received at device B 304. Time mechanism 312, 314 on either device 302, 304 then uses the simple concept of subtraction to determine the amount of time it took from the audio signal 332 to reach from device A 302 to device B 304. Using the speed of sound (and considering other factors, such as temperature, humidity, altitude, etc., that can alter the speed of sound), the time mechanism 312, 314 on either device 302, 304 takes the time it took for the audio signal to travel from device A 302 to device B 304 and converts it into distance or proximity between the two devices 302, 304. It is contemplated that in a real time situation, several devices or even several access points may be employed in a network. Further, time may be calculated in second (e.g., nanoseconds, milliseconds, etc.) and distance may be calculated in distance units of various measuring systems, such as centimeters, meters, inches, yards etc.

Stated differently, in one embodiment, instead of using signal strength as described with reference of FIGS. 1-2, embedded time or clocks in Wi-Fi signals 322, 324 and the audio signals 332 between two listening Wi-Fi devices 302, 304 (having Wi-Fi adapter/radio 152, 154 for listening the Wi-Fi signals 322, 324) are used to aid acoustic-based proximity between two devices 302, 304. The wireless radios 152, 154 of the two listening devices 302, 304 are synchronized because they will both receive the wireless discovery beacon (e.g., Wi-Fi signal 322, 324) from the broadcasting access point 342 at essentially the same time (e.g., within microseconds). However, audio signals 332 between the two devices 302, 304 may be greatly delayed given the slower speed of sound. In one embodiment, Wi-Fi signals 322, 324 are used to provide tight time synchronization on nearby devices 302, 304 combined with audio recordings or signals 332 of the two devices 302, 304 and further using close temporal correlation between audio signals 332 to indicate proximity between the two devices 32, 304.

Figure 4:
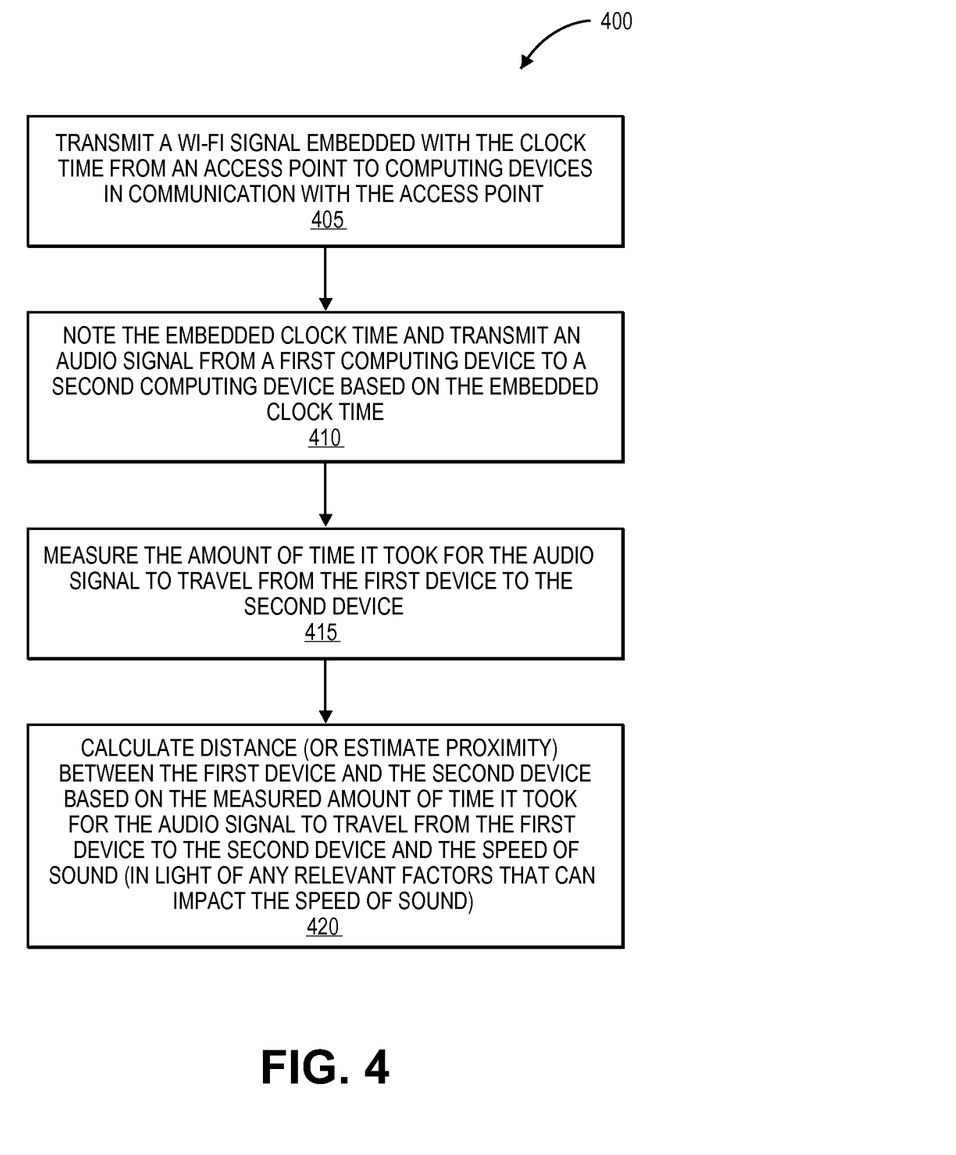
FIG. 4 illustrates a method for multi-antennae-based proximity detection according to one embodiment of the invention.

FIG. 4 illustrates a method for multi-antennae-based proximity detection according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by tight time synchronization mechanism of FIG. 3.

Method 400 begins at block 405 with the access point sending Wi-Fi signals having embedded time or clock, etc., to devices in communication with the access point. At block 410, the embedded time of the devices is noted and an audio signal is sent from a first device at its noted time to a second device at its noted time. At block 415, the amount of time it takes for the audio signal to travel from the first device to the second device is measured. The measurement may include subtracting the noted or embedded time of the second device as provided by the Wi-Fi signal from the time at the second device when the audio signal sent by the first device was received there. At block 420, using the speed of sound (and other relevant factors that can impact the speed of sound) and time it took for the audio signal to travel between the first and second devices, the proximity or distance between the first device and the second device is estimated.

Figure 5:
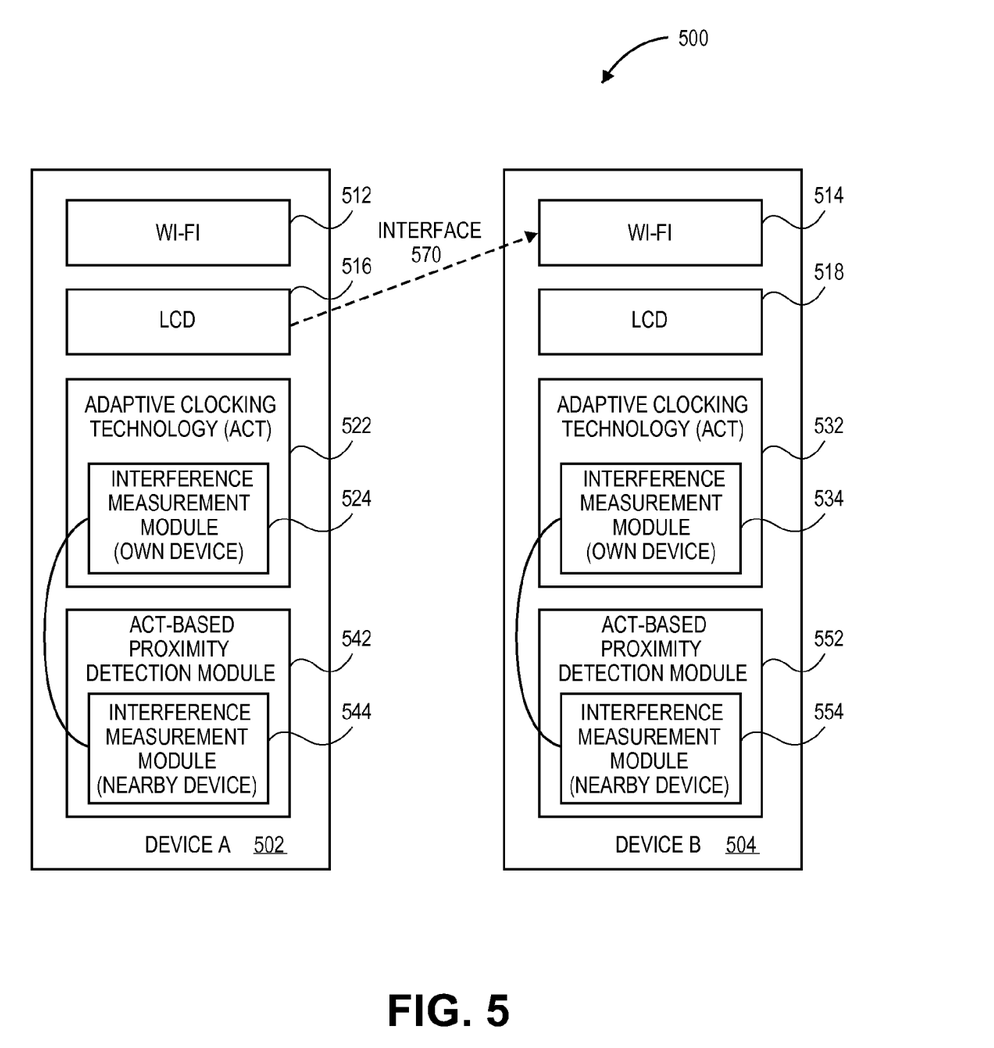
FIG. 5 illustrates an Adaptive Clocking Technology-based proximity detection mechanism for detecting proximity between computing devices according to one embodiment of the invention.

FIG. 5 illustrates an Adaptive Clocking Technology-based proximity detection mechanism 500 for detecting proximity between computing devices according to one embodiment of the invention. In the illustrated embodiment, two similar computing devices A 502 and B 504 are shown as having Wi-Fi signal sending/receiving component 512, 514, Liquid Crystal Display (LCD) 516, 518, Adaptive Clocking Technology (ACT) 520, 522, and ACT-based proximity detection mechanism 524, 526. Typically, the Adaptive Clocking Technology (ACT), such as ACT 520 of device A 502, is used to detect and mitigate interference caused by, for example, the backlight of an LCD, such as LCD 516, on its own Wi-Fi, such as Wi-Fi 512. However, the backlight of LCD 516 can cause an interference not only with own its Wi-Fi 512 but also with that of a nearby device, such as device B 504. Mitigating the interference may include adjusting the LCD by shifting around the time a bit to make it slower or faster, etc., so that the interference is reduce and made to get out of the way of the Wi-Fi.

In the illustrated embodiment, the backlight of LCD 516 of device A 502 is causing interference 570 with the Wi-Fi 514 of device B 504. ACT 522, 532 may include an interference measurement module 524, 534 that can be used to measure the interference impact on own device which may include Wi-Fi signal degradation due to the interference. In one embodiment, ACT-based proximity detection mechanism (ACT-based mechanism) 542, 552 may include an interference measurement module 544, 554 that may be used to measure Wi-Fi signal degradation on another device. This can be accomplished in any number of ways, such as the interference measurement module 544 working with interference measurement module 524 on the same device A 502 or with the interference measurement module 554 on the other device B 504 where the Wi-Fi signal has been interfered. In one embodiment, this signal interference 570 and the degradation of Wi-Fi 514 on device B 504 by the backlight of LCD 516 on device A 502 is used to determine proximity of device A 502 with device B 504.

Figure 6:
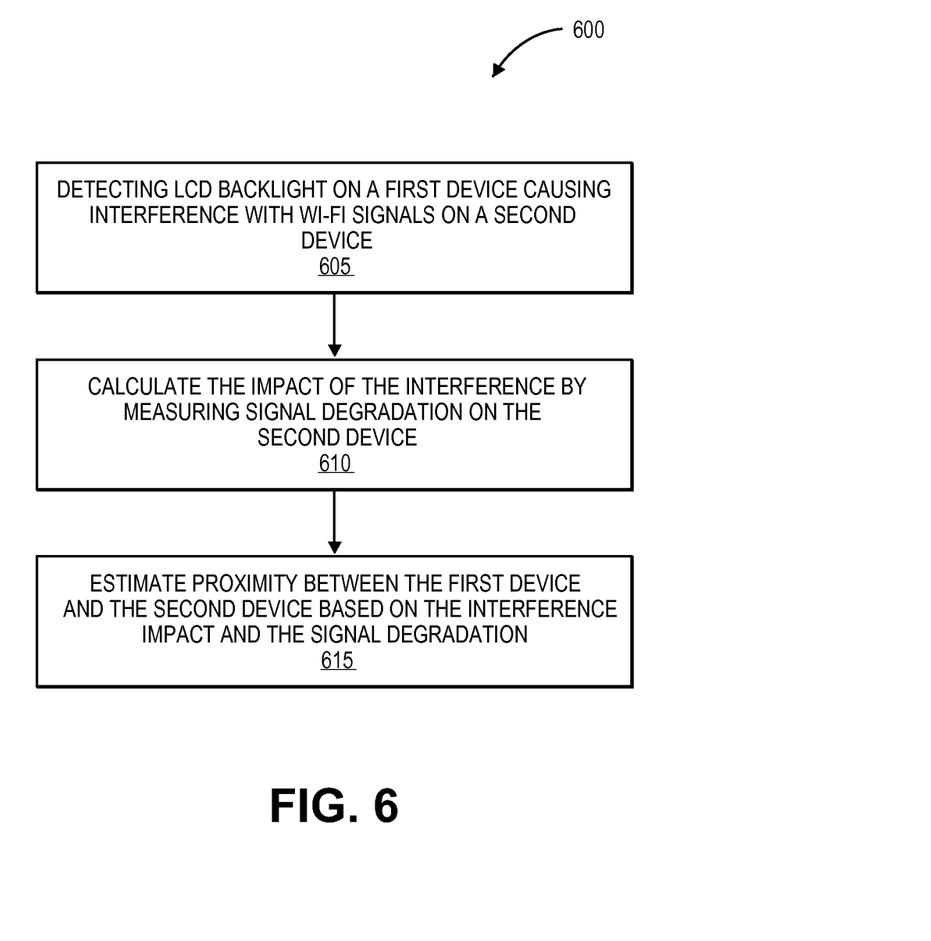
FIG. 6 illustrates a method for Adaptive Clocking Technology-based proximity detection according to one embodiment of the invention.

FIG. 6 illustrates a method for Adaptive Clocking Technology-based proximity detection according to one embodiment of the invention. Method 600 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 600 is performed by ACT-based proximity detection mechanism of FIG. 5.

Method 600 starts at block 605 with detecting LCD backlight on a first device causing interference with the Wi-Fi signal on a second device. At block 610, the impact of the interference is calculated by determining Wi-Fi signal degradation on the second device. At block 615, the impact of the interference as shown by signal degradation is used to estimate proximity of the two devices.

Figure 7:
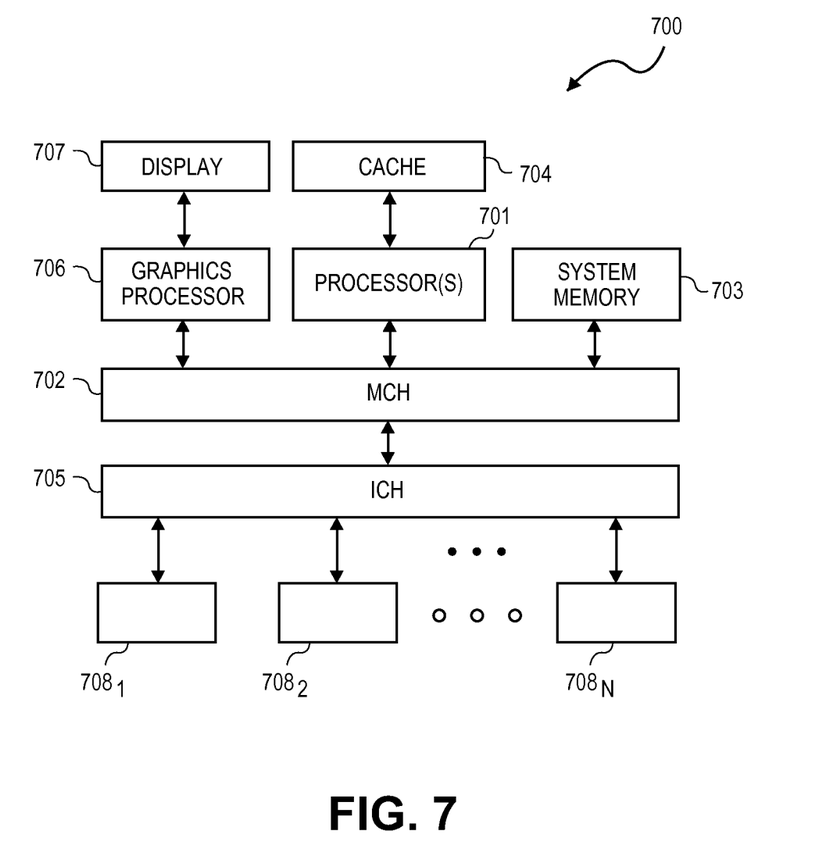
FIG. 7 illustrates a computing system according to one embodiment of the invention.

FIG. 7 illustrates a computing system 700 capable of employing proximity detection mechanisms 100, 300 and 500 of FIGS. 1, 3 and 5, respectively, according to one embodiment of the invention. The exemplary computing system of FIG. 7 includes: 1) one or more processor 701 at least one of which may include features described above; 2) a memory control hub (MCH) 702; 3) a system memory 703 (of which different types exist such as double data rate RAM (DDR RAM), extended data output RAM (EDO RAM) etc.); 4) a cache 704; 5) an input/output (I/O) control hub (ICH)

705; 6) a graphics processor 706; 7) a display/screen 707 (of which different types exist such as Cathode Ray Tube (CRT), Thin Film Transistor (TFT), Liquid Crystal Display (LCD), DPL, etc.; and 8) one or more I/O devices 708.

The one or more processors 701 execute instructions in order to perform whatever software routines the computing system implements. The instructions frequently involve some sort of operation performed upon data. Both data and instructions are stored in system memory 703 and cache 704. Cache 704 is typically designed to have shorter latency times than system memory 703. For example, cache 704 might be integrated onto the same silicon chip(s) as the processor(s) and/or constructed with faster static RAM (SRAM) cells whilst system memory 703 might be constructed with slower dynamic RAM (DRAM) cells. By tending to store more frequently used instructions and data in the cache 704 as opposed to the system memory 703, the overall performance efficiency of the computing system improves.

System memory 703 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 703 prior to their being operated upon by the one or more processor(s) 701 in the implementation of a software program. Similarly, data that a software program determines should be sent from the computing system to an outside entity through one of the computing system interfaces, or stored into an internal storage element, is often temporarily queued in system memory 703 prior to its being transmitted or stored.

The ICH 705 is responsible for ensuring that such data is properly passed between the system memory 703 and its appropriate corresponding computing system interface (and internal storage device if the computing system is so designed). The MCH 702 is responsible for managing the various contending requests for system memory 703 access amongst the processor(s) 701, interfaces and internal storage elements that may proximately arise in time with respect to one another.

One or more I/O devices 708 are also implemented in a typical computing system. I/O devices generally are responsible for transferring data to and/or from the computing system (e.g., a networking adapter); or, for large scale non-volatile storage within the computing system (e.g., hard disk drive). ICH 705 has bi-directional point-to-point links between itself and the observed I/O devices 708.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A method comprising:
   determining, via a processing device, strength of one or more signals being communicated between one or more antennae of a first device and one or more antennae of a second device, wherein determining the strength includes calculating an amount of signal drop associated with each of the one or more signals communicated over one or more paths between the one or more antennae of the first device and the one or more antennae of the second device; and
   determining, via the processing device, proximity between the first device and the second device based on the determined strength of the one or more signals.

2. The method of claim 1, wherein the determined strength is based on Received Signal Strength Indicator (RSSI) between an antenna of the first device and an antenna of the second device, wherein determining the proximity includes determining physical placement of the first device with respect to the second device.

3. The method of claim 1, further comprising:
   detecting an embedded time within a signal being communicated between an access point and the first device; and
   communicating an audio signal between the first device and the second device, and determining a reception time of the audio signal.

4. The method of claim 1, further comprising determining the proximity of the first device and the second device based on at least one of the reception time and the speed of sound.

5. The method of claim 1, further comprising determining Wi-Fi interference caused by a Liquid Crystal Display (LCD) backlight, wherein the proximity is further determined based on the determined interference.

6. An apparatus comprising:
   a first logic to determine strength of one or more signals being communicated between one or more antennae of a first device and one or more antennae of a second device, wherein determining the strength includes calculating an amount of signal drop associated with each of the one or more signals communicated over one or more paths between the one or more antennae of the first device and the one or more antennae of the second device; and
   a second logic to determine proximity between the first device and the second device based on the determined strength of the one or more signals.

7. The apparatus of claim 6, wherein the determined strength is based on Received Signal Strength Indicator (RSSI) between an antenna of the first device and an antenna of the second device, wherein determining the proximity includes determining physical placement of the first device with respect to the second device.

8. The apparatus of claim 6, further comprising:
   a third logic to detect an embedded time within a signal being communicated between an access point and the first device; and
   a fourth logic to communicate an audio signal between the first device and the second device, and determining a reception time of the audio signal.

9. The apparatus of claim 6, further comprising a fifth logic to determine the proximity of the first device and the second device based on at least one of the reception time and the speed of sound.

10. The apparatus of claim 6, further comprising a sixth logic to determine interference caused by a Liquid Crystal Display (LCD) backlight.

11. The apparatus of claim 10, further comprising a seventh logic to determine the proximity of the first device and the second device based on the determined interference.

12. The method of claim 1, wherein the signal drop is performed gradually over the one or more paths and is directly proportional to the proximity of the first device with the second device, wherein a higher signal drop corresponds to a higher distance between the first device and the second device and wherein a lower signal drop corresponds to a lower distance between the first device and the second device.

13. The method of claim 1, wherein the one or more antennae of the first device and the one or more antennae of the second device are strategically placed at the first device and the second device, respectively.

14. The apparatus of claim 6, wherein the signal drop is performed gradually over the one or more paths and is directly proportional to the proximity of the first device with the second device, wherein a higher signal drop corresponds to a higher distance between the first device and the second device and wherein a lower signal drop corresponds to a lower distance between the first device and the second device.

15. The apparatus of claim 6, wherein the one or more antennae of the first device and the one or more antennae of the second device are strategically placed at the first device and the second device, respectively.

16. At least one non-transitory machine-readable medium having stored thereon instructions that when executed cause a processing device to perform one or more operations comprising:
    determining strength of one or more signals being communicated between one or more antennae of a first device and one or more antennae of a second device, wherein determining the strength includes calculating an amount of signal drop associated with each of the one or more signals communicated over one or more paths between the one or more antennae of the first device and the one or more antennae of the second device; and
    determining proximity between the first device and the second device based on the determined strength of the one or more signals.

17. The non-transitory machine-readable medium of claim 16, wherein the determined strength is based on Received Signal Strength Indicator (RSSI) between an antenna of the first device and an antenna of the second device, wherein determining the proximity includes determining physical placement of the first device with respect to the second device.

18. The non-transitory machine-readable medium of claim 16, wherein the one or more operations comprise:
    detecting an embedded time within a Wi-Fi signal being communicated between an access point and the first device; and
    communicating an audio signal between the first device and the second device, and determining a reception time of the audio signal.

19. The non-transitory machine-readable medium of claim 16, wherein the signal drop is performed gradually over the one or more paths and is directly proportional to the proximity of the first device with the second device, wherein a higher signal drop corresponds to a higher distance between the first device and the second device and wherein a lower signal drop corresponds to a lower distance between the first device and the second device.

20. The non-transitory machine-readable medium of claim 16, wherein the one or more antennae of the first device and the one or more antennae of the second device are strategically placed at the first device and the second device, respectively.

* * * * *